United States Patent [19]

Lyons et al.

[11] Patent Number: 4,754,528
[45] Date of Patent: Jul. 5, 1988

[54] BELT LOCK DEVICE FOR HAND HELD OBJECT

[76] Inventors: Robert M. Lyons, 511 W. 3rd St., Reno, Nev. 89503; Robert M. Guernsey, 46 Elm Ave., San Anselmo, Calif. 94960

[21] Appl. No.: 77,159

[22] Filed: Jul. 24, 1987

[51] Int. Cl.$^4$ .............................. A45F 5/02
[52] U.S. Cl. ................. 24/3 L; 24/3 R; 24/3 J; 224/252; 455/351
[58] Field of Search ............... 24/3 L, 3 R, 3 J, 3 E, 24/10 A, 236, 237; 224/252, 269; 455/351

[56] References Cited

U.S. PATENT DOCUMENTS

| | | |
|---|---|---|
| 881,757 | 3/1908 | Winsor . |
| 926,697 | 6/1909 | Hauer ................................. 24/236 |
| 1,061,029 | 5/1913 | Whitehead ......................... 24/3 R |
| 1,692,712 | 11/1928 | Tannebaum ........................ 24/3 J |
| 3,907,182 | 9/1975 | Bryant ................................ 224/252 |
| 3,973,298 | 8/1976 | Moser ................................. 24/236 |
| 4,083,481 | 4/1978 | Selinko .............................. 224/5 H |
| 4,111,343 | 9/1978 | Selinko .............................. 24/3 J |
| 4,164,928 | 8/1979 | Meares .............................. 24/3 R |
| 4,358,036 | 11/1982 | Maltais .............................. 224/252 |
| 4,363,432 | 12/1982 | Warthen ............................. 24/3 L |
| 4,536,925 | 8/1985 | Boothe et al. .................... 455/351 |
| 4,580,347 | 4/1986 | McKnight ......................... 33/138 |
| 4,619,020 | 10/1986 | Lecher, Sr. ...................... 24/10 A |
| 4,635,836 | 1/1987 | Mooney et al. .................. 224/252 |

FOREIGN PATENT DOCUMENTS 725938   5/1932   France ............................... 24/3 R Primary Examiner—Victor N. Sakran
Attorney, Agent, or Firm—Townsend and Townsend

[57] ABSTRACT

A locking apparatus secures a portable hand held object such as a tape measure to a support strip such as the belt of a wearer, some other portion of a wearer's clothing, or a wearer's tool pouch. The apparatus is constructed to provide full encirclement of the belt or other support, eliminating the danger of inadvertent dislodgement while permitting one-hand release. The apparatus consists of a plate bent over at one end to form a lip and at the other to form an angled extension, and mounted in a spring-biased manner to the lateral face of the object such that the lip abuts the lateral face while the angled extension extends over the top, leaving the gap between the plate and the lateral face to receive the belt and a further gap between the angled extension and the top surface of the object to permit manipulation by compressing with the heel of one's hand while one's fingers grip the bottom surface of the object.

12 Claims, 5 Drawing Sheets

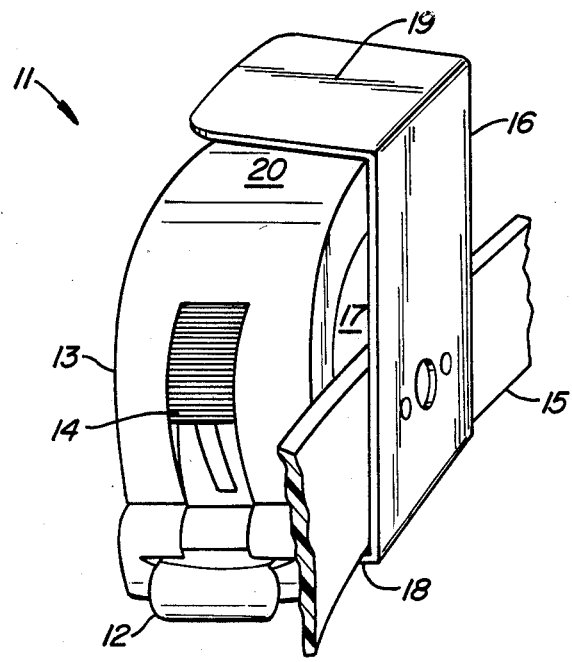
FIG._1.
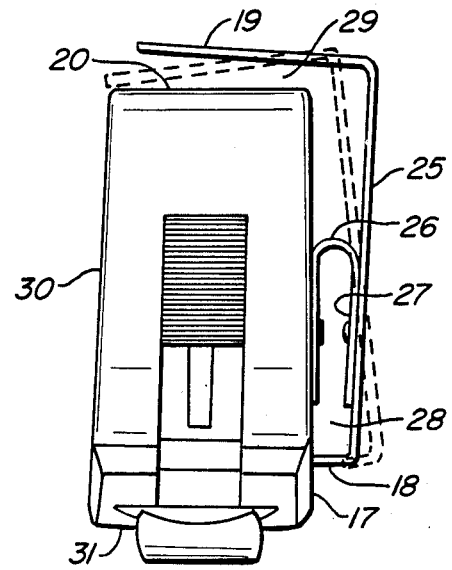
FIG._2.

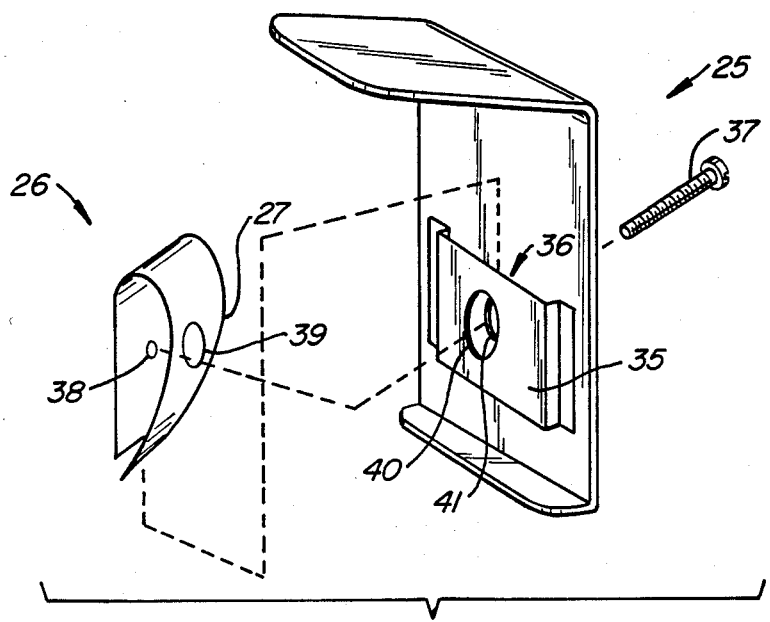
FIG._3.
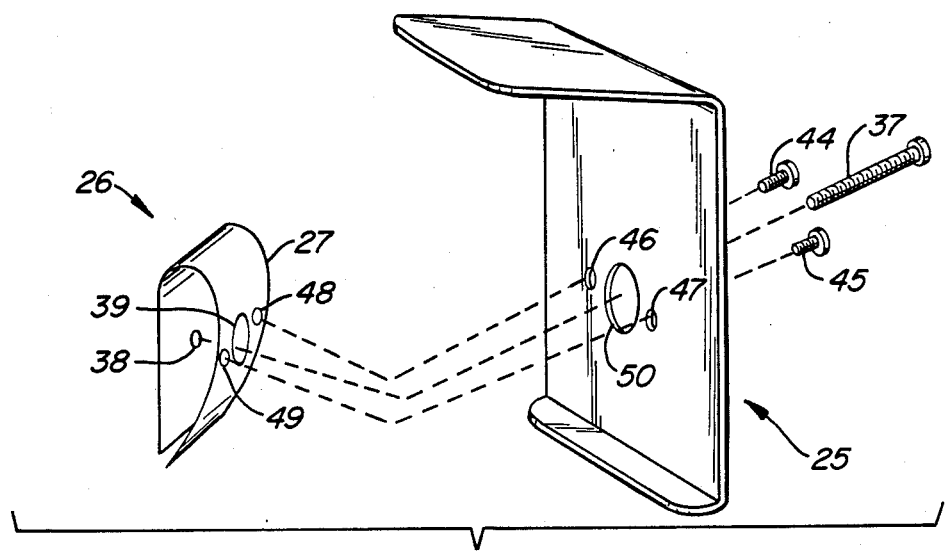
FIG._4.

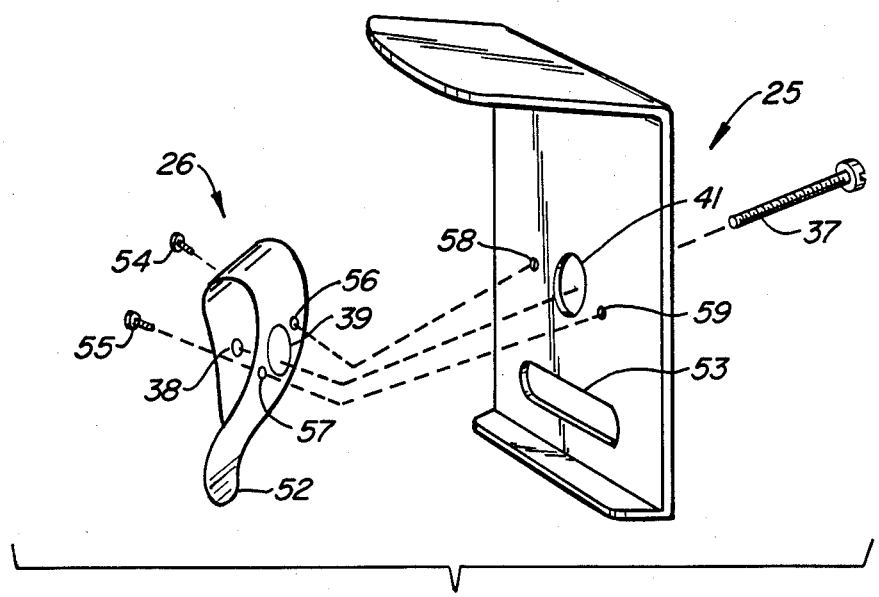
FIG._5.
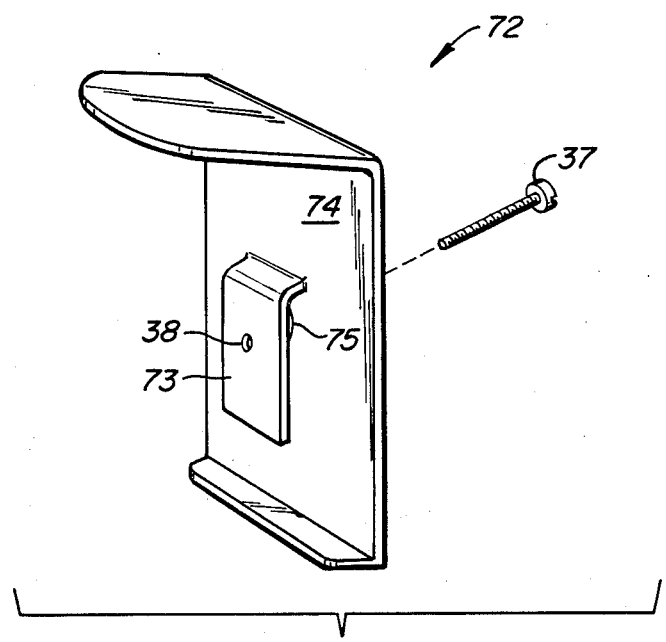
FIG._7.

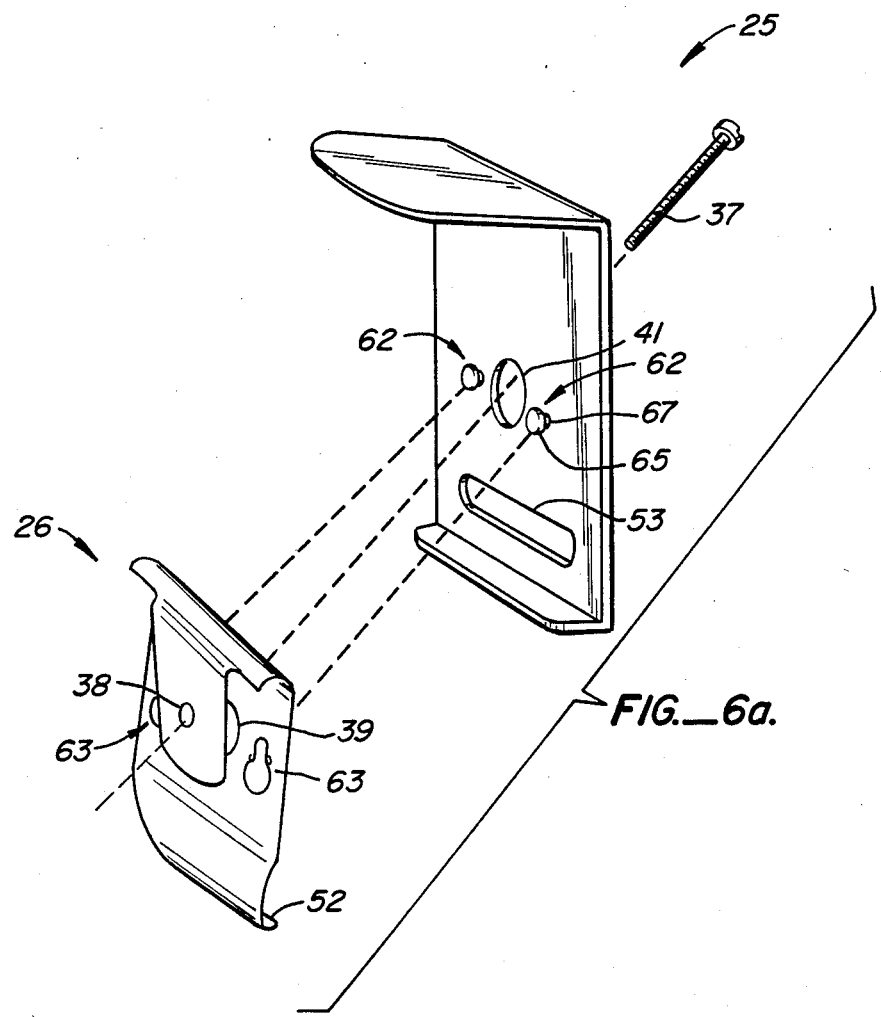
FIG._6a.
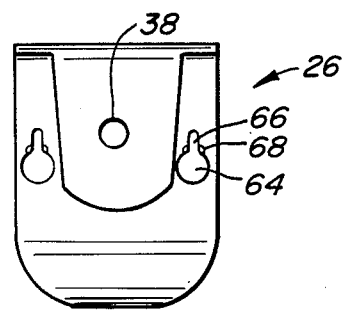
FIG._6b.

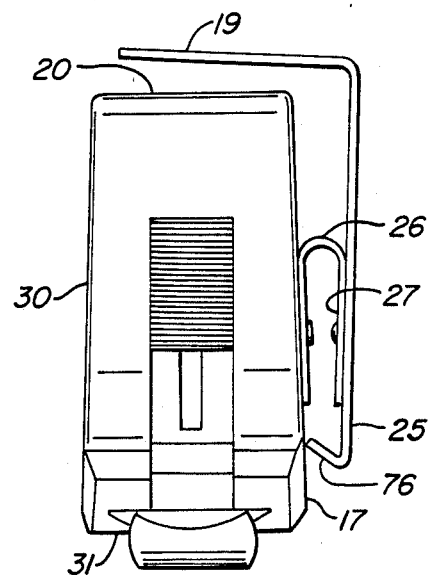
FIG._8.
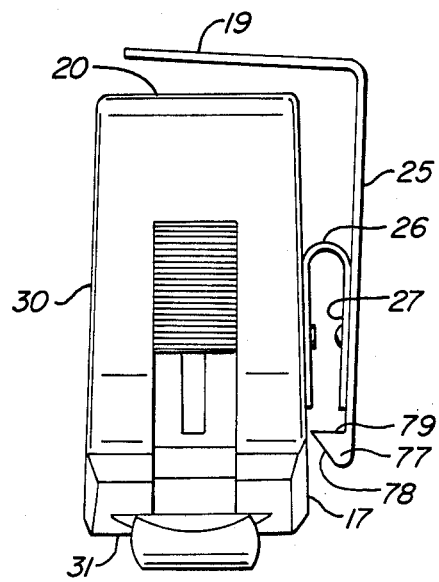
FIG._9.

BELT LOCK DEVICE FOR HAND HELD OBJECT

This invention relates to objects which when not in use are carried on the belt, clothing or tool pouch of the user. In particular, this invention relates to methods of attachment of such objects to any portable or stationary support such as for example the user's belt, clothing or tool pouch, or nearby equipment. This invention finds particular utility as a means of attachment of a tape measure to a user's belt in a manner assuring maximum security, and in its most preferred embodiment was designed to be easily adaptable to tape measures already in use.

BACKGROUND OF THE INVENTION

Objects such as tape measures are commonly designed with spring clips for attachment to belts so that one can keep these objects handy without interfering with one's freedom of motion when they are not in use. For large tape measures, the spring clips are fairly stiff, frequently requiring two hands to open such a clip to slip it over a belt. If the clip is only moderately stiff, it is susceptible to inadvertent disengagement by accidental jostling or being knocked sideways by the user's arm, other tools, or objects such as railings that the user might bump against. This presents a particularly serious problem when one is working at construction sites at a substantial height from the ground. Dropping the tape measure can mean losing it, or if it can be retrieved, the loss of considerable work time in doing so. Dropping a tape measure from a considerable height also presents a serious hazard to persons passing below it.

SUMMARY OF THE INVENTION

It has now been discovered that these problems are overcome by a locking apparatus fixed to the side of the object, the locking apparatus being comprised of a plate or rigid strip having a lip at the bottom and bent over at the top at an angle, preferably about 90°. The plate is secured in a pivotal, spring-biased manner to the lateral face of the object leaving a small gap to permit passage of a belt or similarly shaped support. The plate is positioned so that the lip abuts the lateral face of the object, passing underneath the belt or support, and the angled upper end of the plate extends over the top surface of the object, again leaving a small gap. The pivotal mounting which secures the plate to the object is operated by pressing this angled upper end downward toward the top surface of the object. This pivots the lower portion of the plate away from the lateral face of the object, separating the lip from the lateral face, permitting one to slip the object over the belt or support so that the latter enters the gap between the plate and the lateral face. Once the object and belt or support are joined, the angled upper end of the plate is released, and the spring-biased mounting urges the lip back into position abutting the lateral face. thereby fully encircling the belt or support. The object thus remains secured until release is accomplished by gripping the object using the heel of the hand on top and the fingers on the bottom and squeezing.

The full encirclement of the belt or support by the locking apparatus provides the object with a highly secure means of attachment. This eliminates the danger of dislodgement of the object by jostling, by being violently struck on the sides or bottom, or in the case of belt attachment, by the wearer turning sideways or upside down. At the same time, the locking apparatus imparts to the object a means of quick one-hand release, thereby enhancing considerably both safety and convenience.

BRIEF DESCRIPTION OF THE DRAWINGS

FIG. 1 is a perspective view of a tape measure incorporating a belt lock as one embodiment of a locking apparatus in accordance with the present invention.

FIG. 2 is a further view of the tape measure of FIG. 1. facing the forward edge of the tape measure.

FIG. 3 is an exploded view of an illustrative embodiment of a removable belt lock in accordance with the present invention, designed for attachment to the spring clip of a conventional tape measure housing.

FIG. 4 is an exploded view of a further belt lock in accordance with the invention, shown in a view similar to FIG. 3, using a different means of attachment to the spring clip.

FIG. 5 is an exploded view of a still further belt lock in accordance with the present invention, similar to the view of FIG. 3 although showing a further means of attachment, and designed to accommodate a spring clip with an outwardly curved lower end.

FIG. 6a and 6b are views of a still further belt lock and spring clip in accordance with the present invention, where attachment is achieved by molded studs on the belt lock mating with keyways in the spring clip for easy attachment and removal, thereby providing the user with the option of using either the belt lock or the spring clip without the belt lock as he sees fit.

FIG. 7 is a perspective view of a still further embodiment of the invention, in which a spring clip is encapsulated in a molded belt lock.

FIG. 8 is a view of an embodiment of the invention with a modified lip.

FIG. 9 is a view of an embodiment showing a further modified lip

DETAILED DESCRIPTION OF THE INVENTION AND PREFERRED EMBODIMENTS

The tape measure shown in FIG. 1 is a conventional tape measure of the type widely used among professional mechanics and construction workers as well as those doing home repairs and construction. Tape measures are available in a wide range of lengths, some of the longer measures being on the order of 30 feet and being of considerable weight. All are of a size to be handled and carried, however, as well as bearing spring clips for attachment to the worker's belt when not in use.

Tape measures are merely an example of the type of object to which the present invention is applicable. The larger tape measures are generally too bulky to conveniently fit inside a worker's pocket, of course, and for this reason are particularly amenable to spring clips for belt attachment. The detailed descriptions herein are therefore expressed primarily in terms of their application to tape measures and to their attachment to belts.

Referring to FIG. 1. the tape measure 11 contains a ruled metallic tape 12 coiled inside a rigid metallic housing 13. A slidable locking tab 14 grips the tape internally when lowered to hold the tape out in an extended position, and releases the tape when raised, permitting an internal spring (not shown) to retract the tape 12 back into the housing 13. These are all features of conventional tape measures.

The spring clip (not visible in FIG. 1) attaches the tape measure housing 13 to a wearer's belt 15, a section of which is shown in FIG. 1. In the view shown in the figure, the wearer's body will be at the right forward side of the belt.

In accordance with the present invention, the tape measure housing 13 is modified by the attachment of a locking apparatus 16, which is either secured to or replaces the conventional spring clip. The locking apparatus holds the belt between itself and the lateral face 17 of the tape measure housing, with the lip 18 passing underneath the belt, and an angled portion 19 extending over the top surface 20 of the tape measure housing.

The front end view shown in FIG. 2 shows in more detail the method of attachment of the locking apparatus to the spring clip. The locking apparatus in this embodiment of the invention is formed from a single strip of rigid metal to form a flat plate 25, whose bottom edge is bent at a substantially right angle to form a lip 18 and whose top end is bent also at a substantially right angle to form an angled portion 19. The plate is mounted in such a position that the lip 18 abuts the lateral face 17 of the tape measure housing, and the angled portion 19. extending outward from the plate to a greater distance than the lip 18, passes over the top surface 20 of the housing.

Mounting in this embodiment is achieved through the spring clip 26 normally included with the tape measure as a standard attachment. It will be noted that the outer portion or resilient tongue 27 of the spring clip, which is generally curved on conventional tape measures, has been flattened in this embodiment to facilitate its attachment to the plate 25.

Attachment of the plate 25 to the spring clip 26 is made to define a first gap 28 between the plate 25 and the lateral face 17 of the tape measure housing, the gap being wide enough to accommodate the wearer's belt. The belt passes through this gap, with the spring clip 26 passing over the top of the belt, and the lip 18 passing underneath, to fully encircle the belt. As mentioned above, the gap 28 may also accommodate some other portion of the wearer's clothing, or a tool pouch or any other kind of mobile or stationary support of similar shape such as a strip or rail. For convenience, this discussion will refer to belt attachment.

A second gap 29 is formed between a flange 19 and the top surface 20 of the tape measure housing. It is through this gap that the locking apparatus is manipulated. To open the enclosure formed by the plate 25, spring clip 26, lip 18 and lateral face 17, the user presses down on the angled top 19 of the belt lock, thereby narrowing and closing the gap 29. This pivots the plate 25 so that its bottom portion moves away from the lateral face 17 of the housing, separating the lip 18 from the lateral face to provide an opening for slipping the locking apparatus over the belt (or removing it from the belt). The locking apparatus in this open position is shown in dashed lines. Return of the locking apparatus to its locking position with full encirclement of the belt is achieved by merely releasing the pressure on the flange 19 the spring action of the spring clip 26 urging the plate 25 back into the position shown in solid lines with the lip 18 abutting the lateral face 17 of the housing. This is a one hand operation which the user performs by placing the heel of his hand on the angled top 19, with the palm of his hand and fingers extending down the opposite lateral face 30 of the housing and the fingers curling underneath the housing to grip its undersurface 31.

FIG. 3 illustrates one method of attachment of the locking plate 25 shown in the embodiments of FIGS. 1 and 2 to the spring clip 26. Here, as in FIG. 22, it will be noted that the outer resilient tongue 27 of the spring clip, which normally has an S-shaped profile in conventional spring clips, has been flattened or truncated to remove the lower portion of the S curvature. The method of attachment in this embodiment is a strip of metal 35 bonded to the innerface of the plate 25. The central portion of the strip forms a gap 36 with the innerface of the plate to define a narrow, flat sleeve through which the resilient tongue 27 of the spring clip may be inserted. As an alternative, a molded pocket can replace the metallic strip.

As normally found on conventional tape measures, the spring clip 26 is attached by a screw 37 through a screw hole 38, to mate with a threaded hole in the housing itself (not shown). An access hole 39 in the tongue 27 permits insertion and removal of the screw 37 and the manipulation of a screw driver to do this. Access holes 40, 41 in the metal strip and plate, respectively. are positioned to fall into alignment with the screw hole 38 and the tongue access hole 39, to preserve this accessibility. In this manner, the spring clip 26 can be removed from the tape measure housing, secured to the plate 25 by insertion in the sleeve 36 with the screw hole and access holes aligned, and the combined pieces then attached as a unit to the tape measure housing by insertion of the screw 37 through the access holes 39, 40, 41 into the screw hole 38, followed by a screwdriver to tighten the screw.

An alternative mounting arrangement is shown in FIG. 4. Here a pair of rivets 44, 45 are used for fastening in place of the sleeve of the embodiment of FIG. 3. The rivets pass through rivet holes 46, 47 in the plate 25, followed by rivet holes 48, 49 in the tongue 27 of the spring clip. The spring clip in this embodiment has a screw hole 38 and an access hole 39 as in the embodiment of FIG. 3 to accommodate the screw 37. A single access hole 50 is sufficient for the plate 25. This embodiment provides for permanent attachment of the plate 25 to the spring clip 26.

In the embodiment of FIG. 5 the spring clip 26 is shown in the form in which it is normally found on tape measure housings—i.e., with a S-shaped profile, terminating at the lower end in an outwardly curved tip 52. To permit securement of the plate 25 to the tongue 27 without flattening or cutting off the curved tip 52, a slot 53 is cut into the plate to permit passage of the tip.

Fastening of the tongue to the interior surface of the plate is achieved in any of a variety of ways, including those described above in connection with FIGS. 3 and 4. The fastening method actually shown in FIG. 5 consists of a pair of screws 54, 55. In the particular arrangement shown, the screws pass through clearance holes 56, 57 in the tongue to mate with threaded holes 58, 59 in the plate 25. The locking plate 25 may thus be readily removed from the spring clip 26 to return the spring clip to its normal means of functioning. In this embodiment as in the others, the main securing screw 37 with its screw hole 38 and access holes 39 and 41 are included.

The embodiment shown in FIG. 6a is similar in many respects to that of FIG. 5. The spring clip 26 is conventional in terms of its S-shaped profile and outwardly curved tip 52, and a slot 53 in the locking plate 25 is arranged to received the curved tip 52. The screw hole 38 and access holes 39 and 41 in the spring clip and plate, respectively, are likewise similar.

The means of attachment of the spring clip 26 to the locking plate 25 in the FIG. 6a embodiment, however, is one which lends itself to quick attachment and removal by the user, thus providing the user the option of using the locking plate or of removing it to use only the spring clip in its normal mode of operation. Attachment is thus achieved by molded studs 62 on the inner surface of the locking plate 25, one on each side of the access hole 41, to mate with keyways 63, or keyhole-shaped holes, in the spring clip, one on either side of the spring clip access hole 39.

The arrangement of the keyways is better seen in FIG. 6b. Each keyway has an enlarged circular section 64 to permit passage of the expanded head 65 of the corresponding stud, and a relatively narrow slot-shaped passage 66 along which the neck 67 of the stud can slide. The keyways are positioned such that when the studs 62 are inserted and the spring clip 26 pushed all the way down so that the stud necks 67 are at the top ends of the slot-shaped passages 66, the access holes 39 and 41 are aligned. To stabilize the fit, protrusions 68 are formed on either side of each keyway and the juncture where the circular section 64 meets the slot-shaped section 66, offering resistance to the sliding of the parts relative to each other. This provides a snap-like fit when the spring clip and locking plate are joined. To attach and detach these parts, of course, one must first remove the spring clip from the tape measure.

A still further embodiment is shown in FIG. 7, where the spring clip and locking plate are combined into a unitary structure 72. This is particularly useful for cast or molded clips. During casting or molding of the plate, the spring clip, either a conventional spring clip taken from an existing tape measure housing or one specially made for this purpose, can be encapsulated in the mold. The result is a securing tongue 73 depending from the inner face 74 of the plate, the securing tongue having a resilient character similar to the spring clip in the other embodiments. A fastening screw 37 is again shown, together with a screw hole 38 and an access hole 75. all serving functions analogous to those of the embodiments of FIGS. 3 through 5.

In all of the embodiments shown so far, the lip 18 (FIG. 2) at the bottom of the locking plate is directed at approximately right angles to the plate. Variations of this are shown in FIGS. 8 and 9. FIG. 8 shows an upturned lip 76, forming an acute angle with the plate 25 so that the tape measure can be slipped onto a belt, piece of clothing, tool pouch or surrounding equipment without the necessity of manually opening the locking plate. FIG. 9 shows a similar lip 77 where only its lower surface 78 is angled, the upper surface 79 being horizontal.

The foregoing is offered primarily for purposes of illustration. It will be readily apparent to those skilled in the art that numerous variations and modifications of the features of construction beyond those shown herein may still be made without departing from the spirit and scope of the invention.

What is claimed is:

1. Locking apparatus for releasably securing an object to a support strip, said object having exterior surfaces including a top surface and a lateral face and a spring clip secured to said lateral face, said locking apparatus comprising:

a plate having first and second opposing edges;
a lip protruding from one side of said plate along said first edge;
an extension along said second edge of said plate, angled with respect thereto toward the same side of said plate as said lip and extending further from said plate than said lip; and
means for affixing said plate to said spring clip with said extension extending over said top surface at a gap therefrom and said lip abutting said lateral face thereby holding said spring clip open, whereby pressure on said extension toward said top surface causes separation of said lip from said lateral face to permit insertion of said support strip.

2. Locking apparatus in accordance with claim 1 in which said affixing means comprises a sleeve on said plate for receiving said spring clip.

3. Locking apparatus in accordance with claim 1 in which said spring clip is comprised of a tongue of resilient material and said affixing means is comprised of means defining a slot on said plate for receiving said tongue.

4. Locking apparatus in accordance with claim 1 in which said spring clip is comprised of a tongue of resilient material and said affixing means is comprised of rivets securing said tongue to said plate.

5. Locking apparatus in accordance with claim 1 in which said spring clip is comprised of a tongue of resilient material and said affixing means is comprised of screws to pass through clearance holes in one of said plate and said tongue and to mate with threaded holes in the other of said plate and said tongue.

6. Locking apparatus in accordance with claim 1 in which said spring clip is comprised of a tongue of resilient material terminating in an outwardly curved tip, and said plate further comprises a slot permitting passage of said outwardly curved tip.

7. Locking apparatus in accordance with claim 1 in which said spring clip is comprised of a strip of resilient material curved into an inverted U having first and second sides, with a mounting hole in said first side for screw attachment to said lateral face of said object and an access hole in said second side to permit insertion and removal of a screw through said mounting hole, and said locking apparatus further comprises a hole in said plate positioned to fall into alignment with said access hole and said mounting hole when said plate is mounted to said object.

8. Locking apparatus in accordance with claim 1 in which said affixing means comprises studs protruding from said plate and keyways in said spring clip to receive said studs.

9. Locking apparatus in accordance with claim 1 in which said lip has a surface facing away from said plate, said surface being at an acute angle with respect to said plate.

10. Locking apparatus for releasably securing a tape measure housing to a belt, said tape measure housing having a top surface and a lateral face and a spring clip secured to said lateral face, said locking apparatus comprising:

a plate having top and bottom edges;
a lip protruding from one side of said plate along said bottom edge;
an extension along said top edge of said plate, angled with respect thereto toward the same side of said plate as said lip and extending further from said plate than said lip; and means for securing said plate to said spring clip with said extension extending over said top surface at a gap therefrom and said lip abutting said lateral face, whereby pressure on said extension toward said top surface causes separation of said lip from said lateral surface to permit insertion of a belt.

11. A portable object attachable to a belt, comprising:
a housing having an external contour including a top surface and a lateral face;
a plate having first and second sides and first and second opposing edges;
a lip on said first side of said plate along said first edge;
an extension protruding from said first side of said plate along said second edge, angled with respect to said plate and exceeding said lip;
a resilient tongue on said first side of said plate, offset and substantially parallel thereto to permit passage of a belt between said resilient tongue and said plate; and
means for affixing said resilient tongue to said lateral face of said object, urging said lip against said lateral face with said extension extending over said top surface, whereby pressing said extension toward said top surface pivots said lip away from said lateral face to permit insertion of said belt between said resilient tongue and said plate.

12. Locking apparatus in accordance with claim 11 in which said lip has a surface facing away from said plate, said surface being at an acute angle with respect to said plate.

* * * * *